United States Patent [19]

Dunbar

[11] 4,266,101
[45] May 5, 1981

[54] CONTROL CIRCUIT FOR A TELEPHONE SYSTEM FOR THE CONTROL OF VISUAL AND AUDIBLE SIGNALS

[75] Inventor: Ronald C. Dunbar, Wyncote, Pa.

[73] Assignee: Siemens Corporation, Cherry Hill, N.J.

[21] Appl. No.: 58,679

[22] Filed: Jul. 18, 1979

[51] Int. Cl.³ ............................................. H04M 3/02
[52] U.S. Cl. .................................................. 179/84 C
[58] Field of Search ............. 179/84 B, 84 C, 18 BG, 179/18 B, 84 L

[56] References Cited

U.S. PATENT DOCUMENTS

| | | | |
|---|---|---|---|
| 2,884,491 | 4/1959 | Breen | 179/84 C |
| 4,105,875 | 8/1978 | Schneider et al. | 179/18 GF |
| 4,140,882 | 2/1979 | Regan et al. | 179/84 C |

Primary Examiner—Bernard Konick
Assistant Examiner—Joseph A. Popek
Attorney, Agent, or Firm—Hill, Van Santen, Steadman, Chiara & Simpson

[57] ABSTRACT

A telephone switching system, such as a private branch exchange, incorporates a centrally controlled control unit for controlling operation of visual and audible station instrument display device, without interfering with the voice communication line circuits, and without requiring external circuits and equipment.

9 Claims, 2 Drawing Figures

CONTROL CIRCUIT FOR A TELEPHONE SYSTEM FOR THE CONTROL OF VISUAL AND AUDIBLE SIGNALS

BACKGROUND

1. Field of the Invention

The present invention relates to a control circuit for a telephone system, and more particularly to a circuit for controlling visual and audible signals at the subscriber stations of a private branch exchange.

2. The Prior Art

Arrangements for the switching on of visual and audible signals at subscriber stations in private branch exchanges such as in hotel telephone systems, is known. Typically, the audible signals are produced by connecting an AC signal to the telephone transmission line, and a visual signal is produced by connecting DC to the transmission line. Such arrangements, however, require special line circuits or special external equipment and therefore involve substantial increased costs when added to a telephone communications system.

BRIEF DESCRIPTION OF THE PRESENT INVENTION

A principal object of the present invention is to provide apparatus for controlling visual and audible signals at telephone stations, where such controlling apparatus is under the control of a central control device.

Another object of the present invention is to provide such apparatus without interfering with or replacing the telephone communication circuits, and without requiring external equipment.

A more specific object of the present invention is to provide a system incorporating data and address buses facilitating the actuation of the regular subscriber stations and the connection of visual and audible signals.

In one embodiment of the present invention, an electronic switch is connected in a common ring bus and is controllable by the common control and by a peripheral conversion and storage device, by way of data and address buses. A ring detector is provided for detecting ring signals connected from the common ring bus, and determines the control of the electronic switch. The ring detector is connected to the ring bus and to a peripheral interface driver. A generator is provided for generating an alternating ringing signal and a potential for controlling an optical display at a subscriber station. By use of this apparatus, it is possible to selectively connect ringing signals, and to alternately connect a potential for control of the visual display means by way of the ring bus, in accordance with control commands from the central control device and without interfering with, or replacing, regular communications circuits. This results in a relatively low additional cost required for the visual and audible display units, and only a few centrally located circuits are required, which circuits are coupled to the individual station transmission lines by way of the common ring bus. The additional circuits can therefore readily be added to an existing system. The modification to the central control is also readily made as an addition to an existing system, since it affects only the control of the electronic switch.

These and other objects and advantages of the present invention will become manifest by an inspection of the accompanying drawings and the following description.

BRIEF DESCRIPTION OF THE DRAWINGS

Reference will now be made to the accompanying drawings in which.

Figure 1:
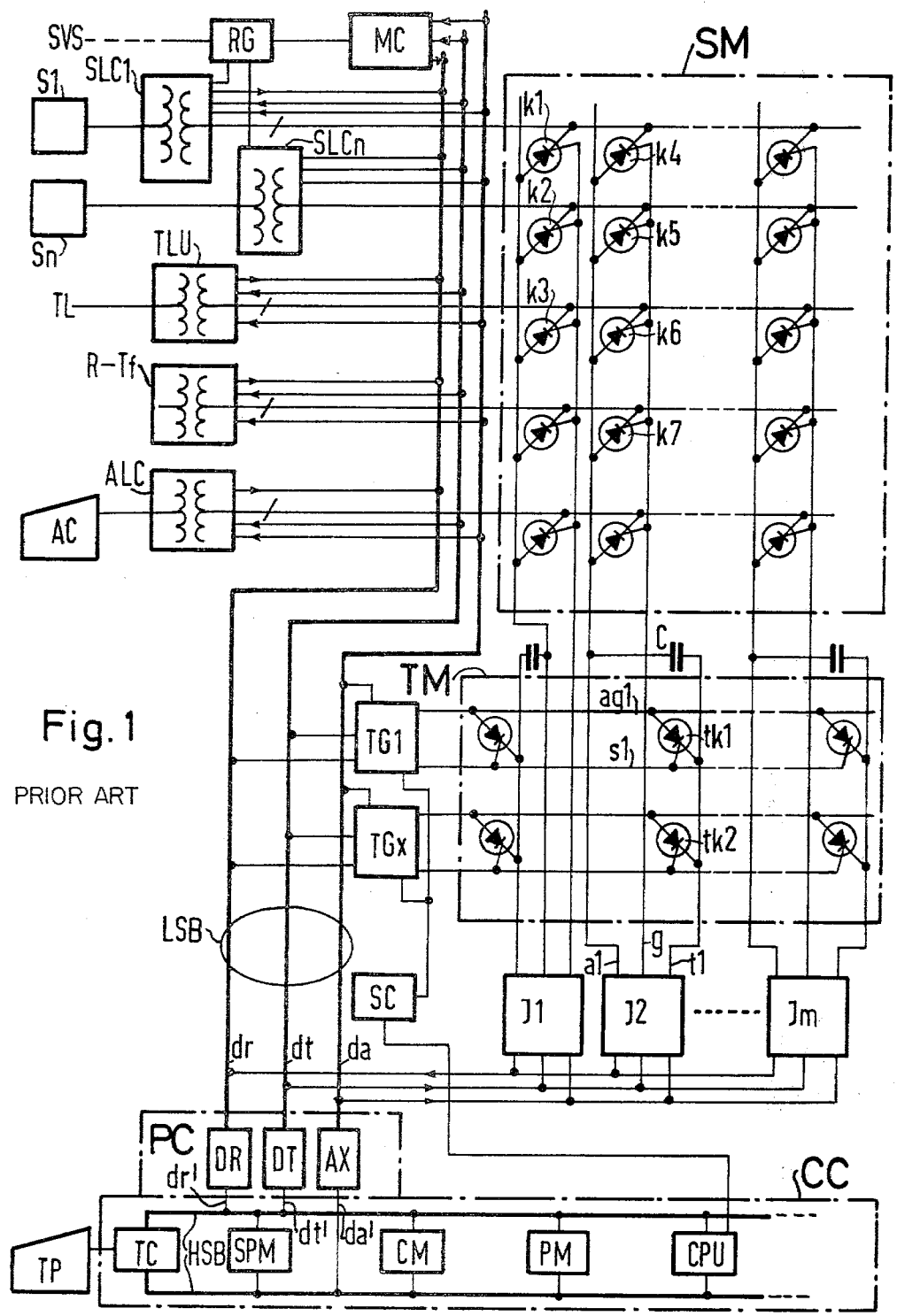
FIG. 1 is a schematic block diagram of a PABX system.

The PABX of FIG. 1 is described in Schneider et al U.S. Pat. No. 4,105,875 for electronic telephone switching system comprising a speech-path switching matrix and tone-connecting matrix and employing electronic crosspoint switching devices, the entire disclosure of which is incorporated hereinto by reference.

The PABX illustrated in FIG. 1 operates according to the principles of a system wherein the subscriber line circuits (SLC1 to SLCn), the tie line circuits, interexchange trunk repeaters and interoffice trunk repeaters such as trunk line circuits TLU, tone-frequency signal receivers R-Tf and connecting circuits ALC of an attendant's station AC are scanned in a periodic sequence so as to determine, on the basis of the last-look principle, if the last operating condition has changed. The last-mentioned four types of circuits or repeaters, as the case may be, and link control circuits J1 to Jm, tone generators TG1 to TGx, and the logic control unit for service SVS are likewise interrogated during idle periods, i.e., during time intervals between two scan periods per address code. This is necessary in order to receive data or transmit instructions to any one of the seven types of circuits mentioned hereinabove.

It is obvious that the one-at-a-time principle always applies to the reception and transmission of data and instructions and to the scanning of circuits. The circuit to be scanned is selected by a data processing unit CPU on the basis of a conventional program stored in program memory PM, which is a constituent part of the central program control CC. In one scan period, all peripheral units and other scan devices are scanned one after another. These scan periods are so chosen that there are free times after each period. In these free times of each period in a scan cycle each of the peripheral units and also memory spaces will be controlled by sending the address of that unit or space via the data bus line, e.g., da; this is called "polling" a unit or line or memory space.

If more idle time exists in a scanning period as needed, particularly during light-traffic periods, these idle times can be used for performing service and test procedures. This is discussed in greater detail hereinbelow.

Switching network SM of the system may consist of one or more stages. In the present example, it is assumed that the switching network for switching the speech paths to the subscriber line circuits, the interexchange trunk repeaters and the attendant's station as well as to the tone-frequency receivers is single-stage. This means that two crosspoints in a column must be operated in the known manner to connect two subscriber stations together or one subscriber to one interexchange trunk repeater. In the system under consideration, the switching network for switching the speech path and the speech path itself have one wire. Thyristors are employed as crosspoint switching elements. These thyristor crosspoint elements are operated in the call condition during the scan periods of the subscriber stations or of the holding circuits, whereby the latter are not scanned in a periodic sequence, but polled.

The crosspoint switches are switched on and off by polling by the crosspoint switch used for connecting a subscriber line circuit to a holding circuit via bus line LSB/dt. The switching elements used in the system and the control principle as well as the various basic functions will be described hereinbelow.

The central control unit CC of the system comprises a central data processing unit CPU of conventional construction which controls all necessary processes in the system, particularly those for scanning and polling the peripheral units with a view to receiving data and the processing thereof as well as the dispatch and transmission of instructions.

To handle these processes, the central data processing unit CPU is provided with a scratch pad memory SPM with variable content. This means that this scratch pad memory SPM is always kept current on the last status of the data with regard to the existing conditions of the subscriber line circuits, line repeaters, crosspoints, etc. Furthermore, the central data processing unit CPU is provided with a program memory PM, in which the provided programs are stored, and with a customer memory CM, which at least contains the specific data for the subscribers, various repeaters and other peripheral units and circuits. If necessary, this memory CM may be polled by the central data processing unit CPU. The customer data memory CM is variable, i.e., the data for subscribers to be stored and other peripheral units and circuits are input by the maintenance man through selection via a peripheral maintenance circuit MC. These are known circuits and not relevant to this invention so that they are not described in detail herein.

The transmission of data and instructions as well as addresses to or from the central data processing unit CPU, program memory PM, customer data storage CM, scratch pad memory SPM and test circuit TC can be accomplished in the bus lines HSB which carry faster rise time pulses. The interrogation of the centralized units and decentralized circuits is effected via the faster bus lines for addresses HSB/da'. The transmission speed on both kinds of bus lines is equal. The faster rise time pulses have a faster rise time of the leading edge because, in the input circuits of the HSB bus line, TTL components are used. In the LSB bus lines MOS components are used; therefore, we have in this case lower rise time pulses. The advantage is that in this case the needed performance is lower as are the reflections if they are long connecting lines.

With regard to the transmission of data and addresses or the reception of data from the peripheral and other units, it must be stated that these operations are done by lower rise time pulses than in the central control unit CC. Hence, the peripheral conversion and storage device PC is provided, which establishes the connection between the faster rise time pulses transmission circuit HSB and the lower rise time pulses transmitting bus lines LSB.

Call connections via the speech path network SM, between two subscriber stations, or between one subscriber station and an interexchange trunk repeater is produced by operating two of the crosspoints in one column, for example k2 and K3. If a conversion of transmitted pulsing signals is to result, a third crosspoint in the same column is to be activated in order to connect a respective tone frequency signal receiver R-Tf. The same applies when, for example, the operator is to cut in, which can result by operation of an additional contact lying in the same column which is occupied for the connection. Such interconnection of telephones, interexchange trunk repeaters, receivers and operators' positions, by operating several crosspoints lying in one column is known and proceeds, for example, in time multiplex technique by means of simultaneous closing of several switches during the same pulse time.

In the system of FIG. 1, the current increase necessary for through-connecting, via the crosspoints, is brought about by the current sink for the speech path crosspoints in the subscriber line circuits or interexchange trunk repeaters for the tone connection crosspoints in the link control circuits. The through-connection necessary is supplied from a link control circuit Jl to Jm for the speech path crosspoints and also for the tone crosspoints. Thyristors k1-k7 are utilized, controlled by one of the link control circuits Jl through Jm. Each control (Jl through Jm) is assigned to one column of the crosspoints of the speech path crosspoint switching matrix and to one line of the tone signal crosspoint switching matrix. Therefor, one separate output is respectively provided in the relevant repeater.

The tone generators TGl and TGx translate the signals received from the central time pulse unit SC into an AC waveform composed of one or more frequencies. For switching the crosspoints, the subscriber line circuits, the interexchange trunk line circuits, the connecting circuits, etc. and also the link control circuits and tone generators are polled by the central data processing unit CPU via the address lines during the idle times between two scanning cycles. In order to again switch off the crosspoints, a renewed polling is required, with an accompanying switch-off instruction. This is also important in regard to the tone signal transmission, as it is additionally necessary for control of the tone signal to state which pulse it is, so the tone switch-off can proceed in accordance with the switch-on length and the pulse length.

As shown in FIG. 1, the tone coupling of the speech path crosspoints k4 through k7, which lie in one column to the anode line al, proceeds via a decoupling capacitor C, and line t1, which represents the cathode line for the tone crosspoints tk1 and tk2 lying in one column. The cathode line t1 is operated with the aid of a current increase via link control circuit J2. When, for example, a tone signal is to be coupled from the tone generator or from the tone translator TG1 to the line leading to subscriber S1 via crosspoint k4, the tone crosspoint tk1, in this case, is to be operated. For this purpose, the cathode line T1 is to be op-rated by the link control circuit J2, the anode line ag1 is to be operated by the tone generator TG1, and the control electrode of the crosspoint is to be operated by tone generator TG1 via control wire s1. The polling proceeds by actuating the tone generator TG1 and the link control circuits via the address lines "da" of the data bus line LSB and the address output AX of the peripheral conversion unit PC. The peripheral conversion unit PC and thus the address output AX receives the addresses of the tone generator and link control circuit to be activated from scratch pad memory SPM, under the control of the data processing unit CPU. The scratch pad memory SPM receives its connection information from the customer memory CM in which the switch-on and pause characters for the individual tone generators are stored. The stored information identify which tone signal is to be transmitted to which subscriber and which link control circuit is occupied. The actuation of the crosspoints proceeds in a sequenced, addressed manner, and the respective information exchange proceeds likewise.

The identification of which tone signal is to be transmitted, results in a command for switching the tone on or off in dependency upon the central pulse unit SC. This means that the tone crosspoint is closed and opened in response to switching-on and switching-off commands. A tone generator is assigned to each pulse as tone translator.

The information present in the customer memory can, as described below, be altered via test circuit TC and the bus HSB, with the aid of keying or dialing. Thereby, the pulses assigned to a tone generator can also be altered. By means of the polled connection of the tone signal, it is safeguarded that only one tone signal may be connected to a specific connection. Double connections for switching of the tone signals are not possible.

Figure 2:
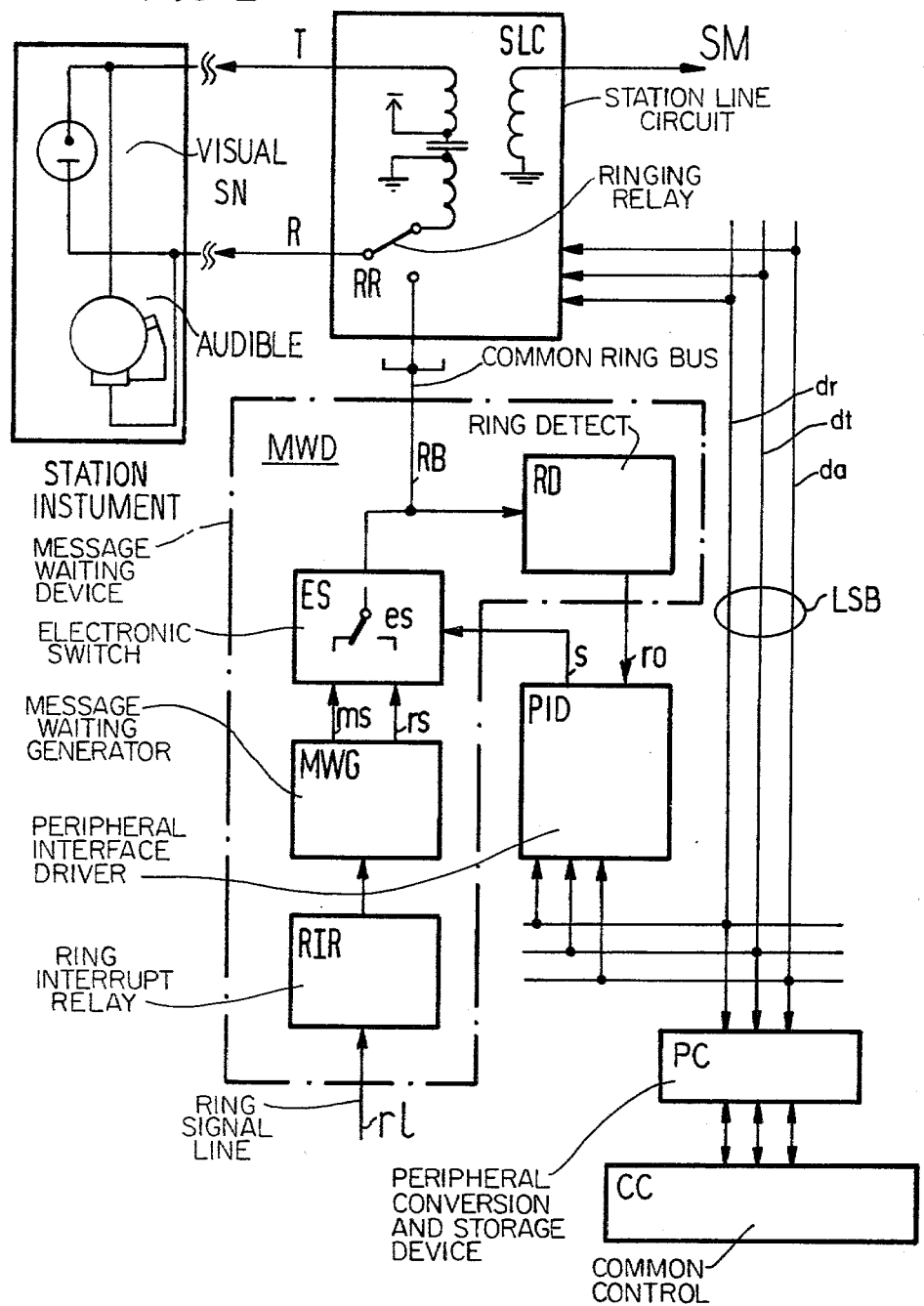
FIG. 2 is a functional block diagram of a system incorporating the preferred embodiment of the present invention.

Details of the preferred form of the present invention are more precisely described with the aid of FIG. 2. An additional peripheral interface driver PID is connected to the line bus LSB. The peripheral interface driver is constructed similar to the link control circuits Jl-Jm, and is controlled by the common control CC in the same manner. A message waiting device MWD is connected to the peripheral interface driver PID in order to control the optical display at the individual subscriber stations, which device is connected in parallel to all station line circuits SLC, via a common ring bus RB. The device MWD comprises an electronic switch ES which alters its switching position in periodic repetition and thereby alternatingly connects the ring signals rs or a visual display control potential ms to the common ring bus RB. Control potential ms is produced by the message waiting generator MWG. The control potential ms can be electrically derived, for example, from the ring signal conveyed via line r1 through a ring interrupt relay RIR in a known manner.

The ring interrupt relay, for example, has a contact which is normally excited and which conveys the ringing signal rl to the generator MWG. This relay functions as a safeguard to allow switching off of the ring signal, so that no uncontrolled ringing can then result.

In order to control the electronic switch ES in a manner per se known, the peripheral interface driver PID is actuated by the common control CC via bus LSB and the peripheral conversion and storage device PC. The instruction received is decoded in a manner per se known and the respective switch command is conveyed to switch ES via a line s. The switching proceeds, for example, in intervals of 2 and 4 seconds, whereby, for example, the ring signal rs is respectively connected for 2 seconds and the control potential ms is connected for 4 seconds to common ring bus RB in continuous alteration and both are available for all station line circuits SLC.

These station line circuits SLC are each equipped with a ring relay RR, of which in the present case only one contact is shown. This contact connects the one wire R of the subscriber connection line to ground potential through a coupling transformer in one switching position, in a manner per se known, and connects R to the common ring bus RB in its other switching position, so that the ring signal rs or the control potential ms is conveyed to the subscriber station.

The common control CC controls, in a manner per se known, which of these two signals is to be conveyed respectively, by outputting corresponding control instructions to the line system LSB, said control instructions being decoded by an input circuit (not shown) of the respectively actuated station line circuit SLC, and which are converted into switch instructions for its respective ring relay contact RR. If the control instructions for switching-on the common ring bus are provided at the beginning of one of the time periods at which the ring signal rs is available in the common ring bus RB, the subscriber station SN connected is called by ringing in the conventional manner. If, however, the control commands for switching-on the ring bus RB respectively result at the beginning of the time periods in which the control potential ms is available in the common ring bus RB, then only this control potential is conveyed to the subscriber station, via wire R of subscriber connection line, thereby turning on only the optical display, for example, as a signal for the subscriber that a message was deposited with the hotel's operator or message center during his absence.

In this manner a ring signal rs or a control potential ms or even both signals can selectively be transmitted to one or several subscriber stations without making a cut into the station line circuits necessary and without having to make individual or specialized provisions in the station line circuits. Thus, the expense required to add the new feature is very small. Merely additional control instructions for the time-correct actuation of the peripheral interface driver PID and of the station line circuits SLC are to be produced by the central control unit, as they are conventional for carrying out switching processes in the other peripheral devices.

Additionally, a ring detector RD is coupled to the common ring bus RB. This ring detector, together with the peripheral interface driver PID monitors the proper operation of the switch ES. No ring signal rs may any longer be effective after a switch instruction via control wire s causes the switch to select the control potential ms. If ring detector RD responds, nevertheless, and reports the presence of ring signal rs via the line ro, that indicates that the switch ES did not properly switch. The peripheral interface driver PID can readily determine such a malfunction condition by comparing the signal on the line ro with the signal on the line s, and an AND-gate, and can then send an alarm signal to the common control CC in a manner per se known.

The telephone units connected as the subscriber stations are conventional in construction. It will be appreciated that the present invention does not involve any additional equipment at the individual subscriber stations.

What I claim is:

1. In a telephone system having a common control unit for the making of telephone connections between calling and called subscriber stations, each of said subscriber stations having telephones with visual and audible signalling devices, a plurality of individual line circuits assigned to the subscriber stations and connecting means assigned to each line circuit for connecting a signal thereto from a common ring bus, the combination comprising: a peripheral conversion and storage device connected to said common control unit, a peripheral interface driver connected by a data and address bus to said peripheral conversion and storage device, a generator connected to said common ring bus for producing a ringing signal and a visual control signal, and an electronic switch connected between said generator and said common ring bus and controllable by said peripheral interface drive for alternately connecting to said common ring bus said ringing signal for operating said audible signalling devices and said visual control signal for operating said visual signalling devices to identify a message waiting condition, a ring detector connected to said electronic switch and to said peripheral interface driver for monitoring the control of said electronic switch.

2. Apparatus according to claim 1, wherein said electronic switch is continuously switched between its alternate connections in response to instruction commands from said common control unit, by said peripheral interface driver, in order to connect the output signals of said generator alternately to said common ring bus.

3. Apparatus according to claim 2, wherein said connecting means assigned to each line circuit are actuated by instruction commands from the common control via said data and address bus in order to connect said common ring bus to the selected subscriber line only within the period during which the signal to be sent to a selected subscriber station is available on the common ring bus.

4. Apparatus according to claim 1, wherein said ring detector is connected to said common ring bus in order to detect a ringing signal present on the common ring bus during periods in which there should be a visual control signal and connected to said peripheral interface driver to control said electronic switch to provide a visual control signal on the common ring bus.

5. Apparatus according to claim 1, wherein said subscriber stations each comprise conventional telephone units.

6. In a telephone system having a plurality of individual subscriber stations with telephones having both audible and visual signalling devices, a central control unit for said telephone system, switching means under control of said central control unit for selectively interconnecting said subscriber stations, the combination comprising: means for producing a ringing signal for operating said audible signalling devices, means for producing a visual control signal for operating said visual signalling devices, electronic switch means connected to receive said ringing signal and said visual control signal and adapted selectively to connect a selected one of said signals to a selected subscriber station over a common bus, and means connected to said central control unit and to said electronic switch for controlling the operation of said electronic switch.

7. Apparatus according to claim 6, wherein said means for controlling the operation of said electronic switch includes means for periodically operating said electronic switch means for alternately making said signals available for connection to a selected subscriber station.

8. Apparatus according to claim 6, including individual connecting means for each of said subscriber stations, said connecting means being connected to said central control unit and responsive thereto for selectively connecting one of said signals from said electronic switch means to a signalling device at a selected station, said central control unit operating said connecting means repetitively at individual times during sequential operating periods.

9. Apparatus according to claim 6, including means connected to said electronic switch means and to said central control unit for detecting a ringing signal and indicating the operating condition of said electronic switch means.

* * * * *